J. W. WARD.
FEED TROUGH.
APPLICATION FILED NOV. 1, 1920.
1,385,510.
Patented July 26, 1921.
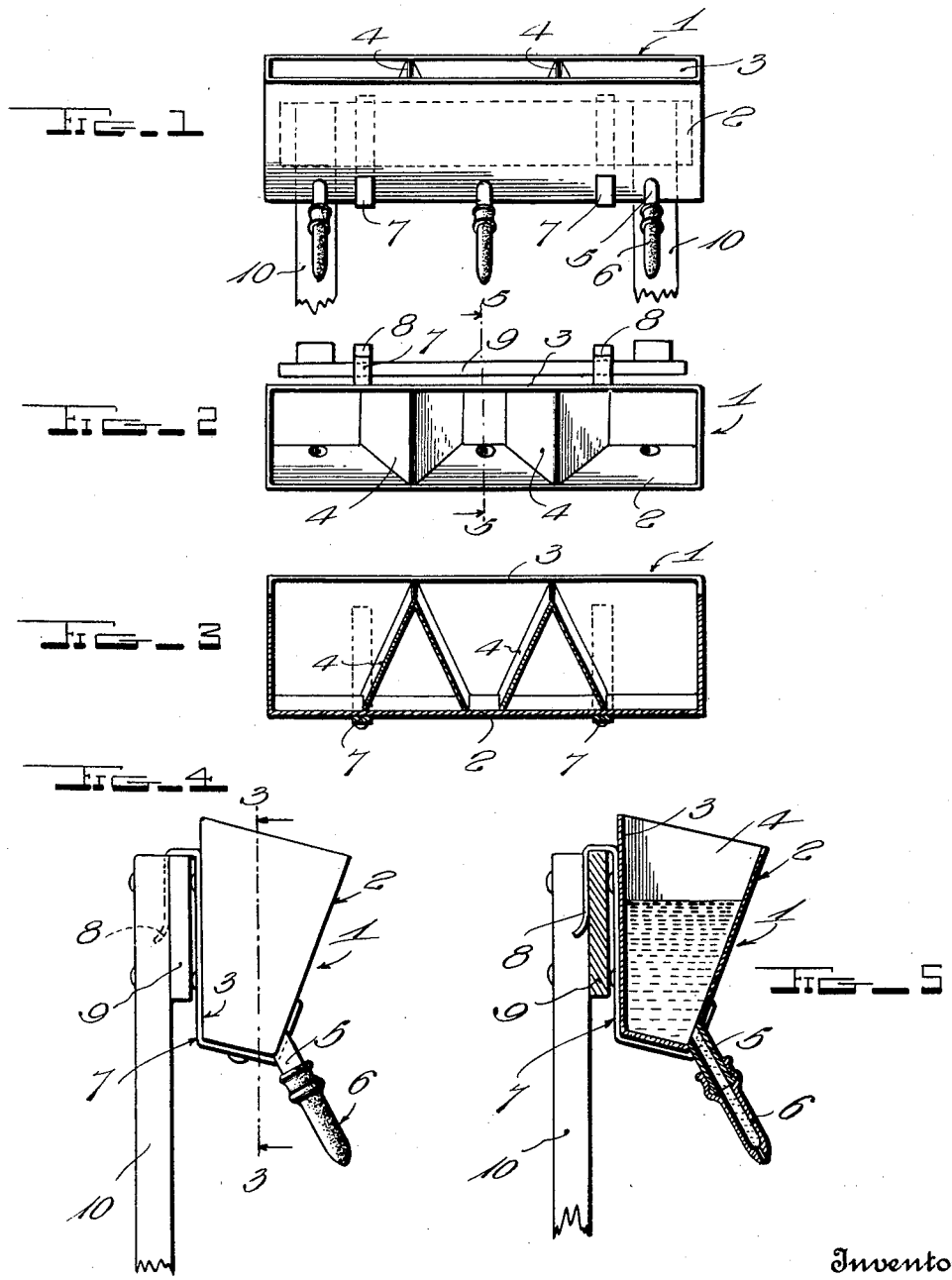
Inventor
J. W. Ward

UNITED STATES PATENT OFFICE.

JAMES WALTER WARD, OF MOUNT VERNON, ILLINOIS.

FEED-TROUGH.

1,385,510.

Specification of Letters Patent.   Patented July 26, 1921.

Application filed November 1, 1920.   Serial No. 421,090.

*To all whom it may concern:*

Be it known that I, JAMES WALTER WARD, a citizen of the United States, residing at Mount Vernon, in the county of Jefferson and State of Illinois, have invented certain new and useful Improvements in Feed-Troughs; and I do declare the following to be a full, clear, and exact description of the invention, such as will enable others skilled in the art to which it appertains to make and use the same.

This invention relates to an improved feed trough which is designed for feeding stock such as calves and other small animals who have been taken from their mothers because of various accidents and other reasons.

The principal object of the invention is to generally improve upon devices of this class by the provision of one of extreme simplicity and durability, the same being in the form of an elongated trough embodying a plurality of separate compartments for containing a predetermined amount of milk or the like, and each of these compartments being provided with a down-turned outlet at its bottom, to which a nipple may be connected for regulating the amount of milk passing from this compartment.

Another object of the invention is to provide a novel supporting bracket for the trough whereby the latter may be held in an inclined position to permit effective draining of the liquid therefrom.

Other objects and advantages of the invention will be apparent during the course of the following description.

In the accompanying drawings forming a part of this specification and in which like numerals are employed to designate like parts through the same:

Figure 1 is a front elevational view of a feed trough constructed in accordance with this invention, the same being shown positioned on a suitable support.

Fig. 2 is a top plan view thereof.

Fig. 3 is a longitudinal sectional view taken on the plane of the line 3—3 of Fig. 4.

Fig. 4 an end elevation.

Fig. 5 is a sectional view taken on the plane of the line 5—5 of Fig. 2, looking in the direction of the arrows.

Referring to the drawings, wherein the preferred embodiment of the invention is clearly illustrated, it will be seen that numeral 1 designates an elongated trough which, in its preferred form, is open at its top and is provided with downwardly and inwardly tapered front and rear walls 2 and 3 respectively. Arranged in the trough at spaced intervals is a plurality of V-shaped partitions 4 which serve to divide the trough into a plurality of separate compartments. Leading from each compartment is a down-turned outlet neck 5 disposed close to the bottom of the trough to insure effective draining of the latter when liquid is being dispensed. For small animals, such as calves, especially those who have been taken from their mother before weaning, I make use of a plurality of nipples 6 and I connect one to each of the outlet spouts 5. These nipples will be of various sizes and the fluid escape holes therein will vary according to the amount of liquid desired to be fed therethrough. By regulating the flow of liquid through the employment of these nipples, proper digestion will be obtained.

In order to insure that the entire contents of the compartment will be drained, it is desirable to support the trough in an inclined position. To this end, I make use of a plurality of brackets 7 which have their lower ends bent in the manner disclosed to support the trough in this manner, while they have their opposite ends bent to form hooks 8 adapted to take over a supporting board or the like 9. This board may be connected to posts or the like 10.

The manner of using the device is thought to be obvious from the description and drawing and it is therefore thought unnecessary to enter into an explanation of the same.

From the foregoing description it will be seen that I have devised an extremely effective device for feeding small animals. By use of this device, farmers and cattle-raisers will be enabled to preserve young animals whose mothers refuse to feed them. However, the most important advantage of the invention is that it serves as an effective means for weaning small animals. Another important feature apparent from the foregoing description is that the construction which I employ renders the device extremely sanitary. Then again, the novel supporting brackets retain the trough in such a position that the entire contents will be effectively drained therefrom. The device may be supported from any convenient place because of the simple supporting brackets. Due to the simplicity of construction, the device will be found extremely inexpensive to both the manufacturer and the user.

Careful consideration of the foregoing description taken in connection with the accompanying drawings is thought to be sufficient to enable persons skilled in the art to which this invention relates to obtain a clear understanding of the same, therefore, a more lengthy description is deemed unnecessary.

Since probably the best results may be obtained with the construction and arrangement shown and described, this construction and arrangement is taken as the preferred embodiment of the invention. However, various minor changes in the shape, size, and arrangement of parts may be resorted to without departing from the spirit of the invention or the scope of the subjoined claim.

I claim:

A device of the class described comprising an elongated substantially rectangular trough, open at its top and provided with inwardly and downwardly inclined front and rear sides of substantially the same height, said front side being provided adjacent its bottom with a plurality of spaced exteriorly disposed downwardly inclined outlet necks, nipples on the ends of the latter, a plurality of substantially V-shaped partitions in the trough dividing the latter into a plurality of separate compartments, one of said necks leading from each of the compartments, said partitions being of substantially the same height as the aforesaid sides of the trough, and supporting brackets for the trough provided at their lower ends with inclined hooks receiving the lower end of the trough for retaining the latter in an inclined position, portions of said brackets extending upwardly and bearing against the rear side of the trough and being formed at their free ends with hooks adapted to take over a supporting board or the like.

In testimony whereof I have hereunto set my hand.

JAMES WALTER WARD.